INVENTORS
JOHN H. LUX
ERNEST O. OHSOL
BY
ATTORNEYS 3,281,259
PROCESS OF RENDERING SURFACE OF POLY-
ETHYLENE FOAM SHEET PRINTABLE
John H. Lux, Charlestown, Md., and Ernest O. Ohsol,
Wilmington, Del., assignors, by mesne assignments, to
Haveg Industries, Inc., a wholly-owned subsidiary of
Hercules Powder Company, New Castle, Del., a corporation of Delaware
Filed Aug. 19, 1963, Ser. No. 303,058
26 Claims. (Cl. 117—11)

This invention relates to polyolefins and more specifically to making polyolefins such as polyethylene and polypropylene printable.

It has previously been proposed to make the surface of polyolefins such as polyethylene printable by subjecting the polyolefin to the action of an oxidizing medium such as an oxidizing flame, aqua regia, chromic acid and ozone or to corona discharge or other electrical discharge. Such treatments modify the inherently slippery or non-adhesive surface of the polyolefin so that it is no longer self-lubricating and will adhere to printing ink, vinylidene chloride resins, etc.

Many of such treatments are relatively expensive and difficult to control.

It is an object of the present invention to prepare the surface of an article made from a polyolefin so that it can be readily printed upon.

Another object is to prepare the surface of an article made from a polyolefin so that it can receive a coating of a vinylidene chloride polymer, i.e. saran.

A further object is to prepare the surface of a foamed polyolefin so that it can be printed upon.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by two different procedures for treating polyolefins either in the form of sheets or other articles, e.g. cups, bottles, boxes, etc.

The solid polyolefins with which the present invention is concerned are polyethylene of high density, e.g., 0.960, polyethylene of low density, e.g. 0.914 or polyethylene of medium density, e.g. 0.935. The polyethylene can be made by high or low pressure technique and can have a molecular weight of 7000 or up, e.g. up to 2,000,000. There can also be employed polypropylene, e.g. melt index 0.4 or melt index 0.8 as well as copolymers of ethylene and propylene (e.g. a 50–50 copolymer). There can also be employed polyethylene or polypropylene which has received a minor amount of cross-linking e.g. polyethylene which has received an irradiation dosage of $2 \times 10^6$ rad to $30 \times 10^6$ rad. Such cross-linked polyethylenes are disclosed in Rainer et al. Patent 2,877,500 and Baird et al. Patent 3,022,543. Cross-linking can also be accomplished by peroxides. The polymer can be oriented either uniaxially or biaxially although this is not essential.

Unless otherwise indicated all parts and percentages are by weight.

The first method for making the polyolefin surface receptive to printing ink or saran is to pass polyethylene (or other polyolefin) having in the surface area a foaming agent, preferably together with a nucleating agent, over a source of high heat such as a high intensity radiant heater so disposed that the surface temperature of the polyethylene is brought to a point at which the foaming agent and nucleating is activated, producing bubbling action. The heating is so adjusted that the tempeature of the polymer in the surface area is sufficiently high to give a relatively low polymer viscosity and permit the bubbles to break. This produces a surface permeated by a large number of very fine pores and is printable and also will adhere to saran. The size of the bubbles is generally 1 to 10 microns. The heating is sufficient that only a fraction of the thickness of the article, usually 0.5 to 2 mils, is heated. Thus when treating unfoamed polyethylene film of 1 to 5 mils thickness care is taken that not over half the thickness of the film is heated sufficiently to form bubbles.

In the preferred form of the first method according to the invention, however, there is employed a foamed polyolefin, e.g. foamed polyethylene, having an unfoamed, polyethylene skin integrally united to the foam. The skinned polyethylene foam, e.g. in sheet form can be prepared by methods known in the art, e.g. Erdman application 262,917, filed March 5, 1963, and Erdman application 244,382, filed December 13, 1962. Since the skin is formed by chilling the surface of a foamable composition and allowing the portion below the surface to foam, the skin portion has residual foaming agent and nucleating material therein. The high intensity radiant heater activates these substances producing additional bubbling action. The heating is adjusted so that the temperature of the polymer in the surface area is sufficiently high to give a relatively low polymer viscosity and permit the bubbles to break. This can be achieved without causing rupture of the subsurface bubbles by using relatively short time, high temperature radiant heating. The foamed sheet can have either a top and bottom unfoamed skin integral with the foamed core or need have only one skin. Generally each skin is 1 to 10 mils thick and the foamed portion is 8 to 300 mils. The skin, or, if a top and bottom skin are both present, the total of the skins is not greater in thickness than the foamed portion. The size of the bubbles formed in the skin portion is usually 1 to 10 microns. Preferably the radiant heater only melts a portion of the skin depth so that there still remains some skin therebeneath which is impermeable to liquids, e.g. if the skin is 2 mils thick the radiant heat-infi generally is not carried out beyond the point where 1 mil of the skin forms bubbles. The printing or saran is applied. The heater can provide a temperature for example of 600 to 900° C. although this can be varied.

As the saran there can be used vinylidene chloride homo and copolymers, e.g. vinylidene chloridevinyl chloride copolymer and vinylidene chloride-acrylonitrile copolymer. Saran F–120 can be applied for example from a 10% solution in acetone (Saran F–120 is vinylidene chloride-acrylonitrile 80:20).

The second procedure for achieving a microporous printable polyolefin, e.g. polyethylene is to prepare a conventional closed cell foamed polyolefin sheet and pass the sheet under a microprecision surface grinder so set that only the surface layer of polymer is ground away, leaving exposed open fragments of bubbles. The entire sheet need not be foamed, e.g. the surface only need be in foamed condition. In this procedure also it is preferable to have bubbles of 1 to 10 microns. The resulting surface formed by the grinding is easily and uniformly printable or adherable to saran. The grinding should be carried out with a high quality abrasive, e.g. silicon carbide or diamond grains under conditions whereby heating of the polymer surface to above its heat distortion temperature is avoided. This prevents flowing and resealing of the surface. To insure this, the foam sheet can be cooled after formation and prior to grinding and/or cooling medium, e.g. a fluid such as air, water, air-water mist, nitrogen, helium, argon or neon can be provided at the abrasive surface.

The invention will be best understood in connection with the drawings wherein.

Figure 1:
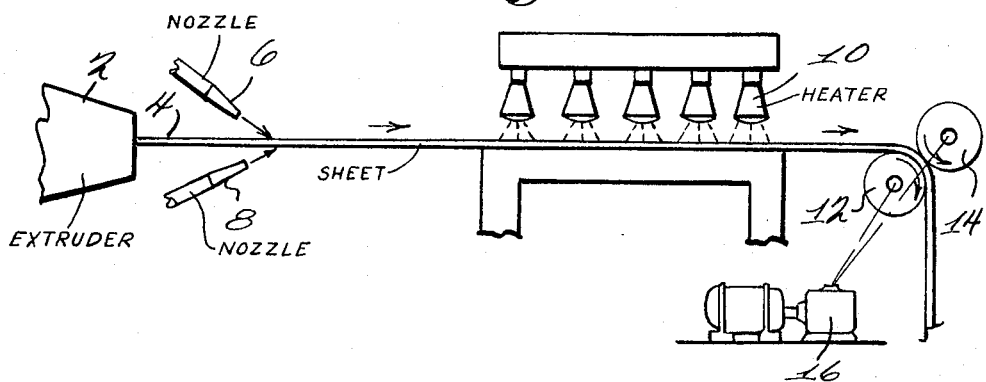
FIGURE 1 is a schematic view showing the first method according to the invention.
Figure 2:
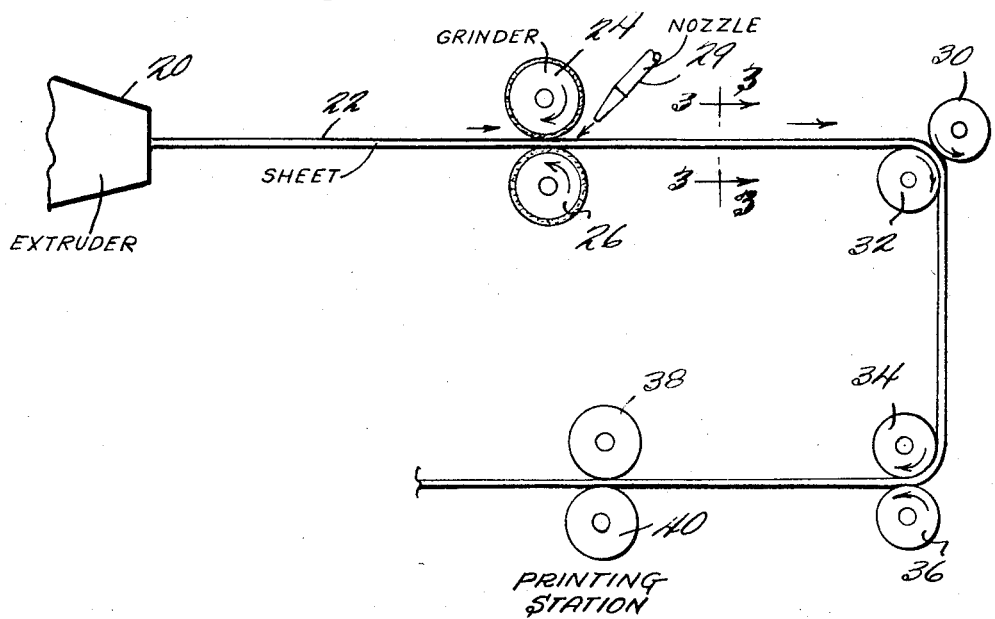
FIGURE 2 is a schematic view showing the second method according to the invention.

The preferred mode of incorporating the foaming agent into the polymer is by pre-mixing the pelletized, solid, thermoplastic polymer, e.g. polyethylene, with a minor amount of an absorbent having absorbed thereon a volatile liquid (i.e. the foaming agent) which is non-reactive with and which has not more than a slight solvent action on the polymer. The volatile liquid should volatilize below the softening point of the polymer.

As the absorbent there can be employed any conventional absorbent in finely divided form, such as diatomaceous earth (Celite), fuller's earth, silica gel, e.g., Cab-O-Sil and Hi-Sil, activated alumina, molecular sieves, attapulgus clay and activated carbon. The absorbent is usually used in an amount of 0.1 to 15%, preferably 0.5 to 10% by weight of the polymer, although up to 25 or 30% of absorbent can be employed. The absorbent is an inert filler of large surface area but small particle size, e.g., 200 mesh or below.

As the volatile liquid there can be used aliphatic hydrocarbons boiling between 10° and 100° C. and preferably between 30° and 90° C., e.g., petroleum ether (containing primarily pentane or hexane or a mixture of these hydrocarbons), pentane, hexane, isopentane, heptane, cyclohexane, cyclopentane, pentene and neopentane. Other volatile liquids include methanol, ethanol, methyl acetate, ethyl acetate, butane, acetone, methyl formate, ethyl formate, dichloroethylene, perchloroethylene, dichlorotetrafluoroethane, isopropyl chloride, propionaldehyde, diisopropyl ether, dichlorodifluoromethane, a mixture of pentane with 5 to 30% of methylene chloride or other volatile lower halogenated hydrocarbon.

The amount of volatile liquid absorbed on the absorbent can vary from 5 to 150% or more based on the weight of the absorbent. The amount of liquid absorbed will depend upon the capacity of the absorbent for the particular liquid. Normally, the absorbent containing the volatile liquid will appear to be a dry powder. The volatile liquid employed should be one which is non-reactive with the particular polymer employed. Usually, the amount of volatile liquid will be 0.1 to 15% by weight of the polymer, e.g., polyethylene, to be expanded. The amount of volatile liquid will depend upon the extent of foaming desired. In general, the greater the amount of absorbed volatile liquid in the polymer-absorbent mixture the more the expansion. It has been found that good expansion can be obtained using very small amounts of the volatile liquid.

The free-flowing powder consisting of the low boiling solvent or semi-solvent absorbed on the inert filler of large surface area is added to the extrusion grade plastic pellets, preferably along with the nucleating agent, and tumbled in a mixer. The powder containing the volatile blowing agent will then disperse uniformly throughout the mixture while adhering to the plastic pellets. The mixture is then fed into the hopper of an extruder.

The nucleating agent insures the formation of a uniform foamed plastic having microporous bubbles. The nucleating agent is used in an amount of from 0.02 to 10% of the total polyolefin, e.g. polyethylene, by weight. Preferably, 0.4 to 2% of the nucleating agent is used.

Conventionally, the nucleating agents are made up of two materials which react to form carbon dioxide and water. The two materials are normally used in approximately equivalent amounts. As the carbon dioxide liberating materials there can be used ammonium, alkali and alkaline earth carbonates or bicarbonates, e.g., ammonium bicarbonate, sodium bicarbonate, sodium carbonate, potassium bicarbonate, calcium carbonate. The other material is an acid or acid-reacting salt, preferably solid, which is sufficiently strong to liberate the carbon dioxide from the carbonate or bicarbonate. Generally, the acid has at least 3.0 milliequivalents of acidic hydrogen, and preferably at least 10.0 milliequivalents, per gram. The acid can be organic or inorganic. Suitable acidic materials include boric acid, sodium dihydrogen phosphate, fumaric acid, malonic acid, oxalic acid, citric acid, tartaric acid, potassium acid tartrate, chloroactic acid, maleic acid, succinic acid and phthalic acid. In place of the anhydrous acids or salts there can be used the solid hydrates, e.g., oxalic acid dihydrate and citric acid monohydrate.

While not essential, there can also be added a wetting agent such as Bayol 35 (a petroleum aliphatic hydrocarbon white oil), kerosene having an average of at least 8 carbon atoms in the molecule, alkylphenolalkylene oxide adducts, e.g., Triton X-100 (t-octylphenol-ethylene oxide adduct having 10 ethylene oxide units in the molecule), sodium lauryl sulfate and sodium dodecylbenzene sulfonate. The wetting agent can be nonionic or anionic.

The foamed sheet or tube is formed by extruding a hot sheet of foamable polyolefin composition, rapidly chilling the outer surface of the sheet or tube to prevent expansion thereof and to form an outer skin while permitting the still warm core of the sheet or tube to expand. The chilling can be accomplished by cooling the surface with a fluid such as an air blast, an air-water mist, argon, helium, neon or nitrogen. Usually the fluid blast is at 0° to 30° C. and the flow of fluid is at 40 to 100 ft./sec.

In the event that a foamed core between an inner end outer skin is desired then the inner surface of the sheet or tube is also quench chilled to prevent expansion while the foamed core is permitted to expand.

Any conventional polyethylene printing inks can be used such as black NOX 7362 of International Printing Ink or Bensing and Deeney Yellow-94R-8/13(4–1245) as well as the other printing inks set forth in Keller et al. Patent 2,968,576 as well as more recently introduced polyethylene printing inks.

The printing can be carried out as shown in the Keller et al. patent. Similarly, the Saran can be applied as shown in the Keller et al. patent, e.g. as a 15% solution of Saran F-120, 200 centipoises in a mixture of 3 parts acetone and 1 part methyl ethyl ketone.

*Example 1*

Referring more specifically to FIGURE 1 of the drawings, there was extruded at 177° C. through the die of extruder 2 a sheet 4. The sheet was made from a mixture of 100 parts polyethylene, 2 parts of a mixture consisting of n-pentane absorbed on an equal weight of Hi-Sil 233 (silica gel), 0.375 part of sodium bicarbonate, 0.3 part of anhydrous citric acid and 0.25 part of Bayol 35. The upper and lower surfaces of the sheet 4 were quench chilled by air sprays from nozzles 6 and 8. As a result there was formed top and bottom unfoamed skins and a foamed core. The sheet had a thickness of 15 mils including an upper non-porous skin of 1 mil, a lower non-porous skin of 1 mil and a foamed core of 13 mils integrally united to the two skins. The sheet 4 was then passed under high intensity radiant heater 10 at a temperature of 760° C. for 1 second. The heating was sufficient that the temperature of the polyethylene in the top half of the upper skin was sufficiently high to activate the foaming agent and nucleating material producing bubbles of about 5 microns diameter. The polyethylene in this top portion of the skin was reduced to a low viscosity and the bubbles in this top portion broke. The relatively short time of treatment with the radiant heater did not cause rupture of the subsurface bubbles present in the foamed core. The sheet then passed between back up roller 12 and impression cylinder 14, both driven by motor 16. Any conventional polyethylene ink can be applied by the impression cylinder such as the Black NOX 7362 previously set forth.

*Example 2*

A foamed sheet of polyethylene (regular high pressure, density 0.917, molecular weight 20,000) having thickness of 10 mils including an upper unfoamed non-porous skin of 1 mil and having a density of 37 lbs./cu. ft. was provided. The 1 mil skin still had the residual foaming agent and nucleating material therein. (The foamed sheet was prepared from a formulation containing 100 parts of the polyethylene, 2 parts of a mixture consisting of n-heptane absorbed on an equal weight of silica gel, 0.375 part of sodium bicarbonate and 0.3 part of anhydrous citric acid. The skin was formed by chilling the upper surface as the foamable composition was extruded in sheet form.) The sheet was passed under radiant heater 10 at a temperature of 760° C. for 1 second to activate the foaming agent and nucleating material and to produce bubbles of 4–6 microns diameter in the top portion of the skin. The polyethylene in the top portion of the skin was reduced to low viscosity and the bubbles broke. The surface formed in this fashion readily received printing indicia applied from an impression cylinder as shown in FIGURE 1 of Keller Patent 2,968,576.

*Example 3*

An unfoamed polyethylene film 3 mils thick was extruded from the same composition employed in Example 1.

The film was kept from foaming by quench chilling both top and bottom surfaces immediately after extrusion. This film was then passed under the radiant heater at 800° C. for 1 second to cause bubble formation in the upper portion of the film and to cause rupturing of the bubbles. The thus treated film readily received printing ink on the surface having the ruptured bubbles.

*Example 4*

The procedure of Example 1 was repeated using the same polyethylene composition. However, in place of applying an impression cylinder to the radiant heat treated film there was applied a coating of Saran F-120 from a 15% solution in a 3:1 mixture of acetone and methyl ethyl ketone by passing the film through transfer rollers having the Saran F-120 solution thereon. Good adhesion of the saran to the polyethylene film was obtained only on the surface which had been radiant heat treated. In order to secure good adhesion of both skin surfaces of the foamed polyethylene film to the Saran, the lower surface of the foamed sheet was well as the upper surface can be subjected to the treatment with the radiant heater at 760° C. for 1 second.

*Example 5*

In place of using polyethylene of low density as in Example 1, there can be similarly used polyethylene of high density, e.g. 0.96. In this case the polyethylene is extruded at 200° C.

*Example 6*

Figure 3:
FIGURE 3 is a partial sectional view of a sheet at the stage indicated at 3—3 in FIGURE 2.

There was provided a closed cell foamed polyethylene sheet 20 mils thick from extruder 20. The polyethylene was of low density (0.916) and molecular weight 20,000. The sheet was completely foamed, i.e. it had no skins. The foamed polyethylene sheet 22 had a bubble size of 6 microns. The sheet was then passed between microprecision surface grinder 24 and back up roll 26 and the upper surface 28 ground to a depth of 0.5 mil. This opened up the surface bubbles 26 as shown in FIGURE 3. The grinding is carried out with a high quality abrasive, e.g. a silicon carbide or diamond abrasive wheel so that only the surface layer of polymer is ground away, leaving exposed open fragments of bubbles. Heating of the polymer surface to above its heat distortion temperature should be avoided to prevent flow of the polymer and resealing of the surface. Thus a cooling fluid, e.g. air or an air-water mist is applied through nozzle 29 at the abrasive surface. Alternatively the surface of the foamed sheet can be chilled by an air blast prior to the surface grinding, e.g. by an air stream or chilling can be done both prior to and during the grinding operation.

The foamed polyethylene sheet having the ground surface is passed between guide rolls 30 and 32 and 34 and 36 to the print station where it is passed between printing cylinder 38 and back up roll 40. The treated surface is easily and uniformly printable using any of the printing inks designed for polyethylene.

If it is desired to apply printing to both upper and lower surfaces of the foamed polyethylene sheet then the lower surface is also subjected to microprecision surface grinding, e.g. to a depth of 0.5 mil.

The foamed polyethylene which has had its surface ground to open the bubbles can also be treated with a coating of Saran, e.g. by using a Saran F-120 solution as in Example 4. The Saran coating renders the polyethylene impervious to fluids, both gases and liquids, which attack and/or penetrate polyethylene.

In place of polyethylene in any of the above examples, e.g. Examples 1 and 6, there can be used foamed polypropylene, e.g. of melt index 0.4.

The processes of the present invention can be carried out continuously or intermittently. They also can be used with shapes other than sheets, e.g. with foamed polyolefins in the form of tubes, cups, bottles and other containers.

We claim:

1. A process of rendering the surface of an article made of a composition containing a foamable polymer of a monoolefin having 2–3 carbon atoms capable of adhering to a coating comprising heating the surface area only of the polymer sufficiently to form bubbles and to cause the bubbles to break leaving exposed fragments of bubbles while not significantly altering the balance of the article.

2. A process according to claim 1 including the step of applying printing ink to the treated surface.

3. A process according to claim 1 including the step of applying a vinylidene chloride polymer to the treated surface.

4. A process according to claim 1 wherein the heating is accomplished by radiant heating.

5. A process of rendering the surface of a foamable polymer composition of a monoolefin having 2–3 carbon atoms capable of adhering to a coating comprising providing an article comprising an unfoamed skin of such composition integrally united to a foamed layer of the composition, heating said skin to form bubbles at least on the surface of the skin and to give a relatively low polymer viscosity in said heated area and breaking said bubbles in the skin to leave exposed fragments of bubbles while maintaining the bubbles in the foamed layer unbroken.

6. A process according to claim 5 wherein printing ink is applied to the skin surface over the broken bubbles.

7. A process according to claim 5 wherein a vinylidene chloride polymer is applied to the skin surface over the broken bubbles.

8. A process according to claim 5 wherein the heating is regulated so that bubbles are formed only partially through said skin.

9. A process according to claim 8 wherein a vinylidene chloride polymer is applied to the skin surface over the broken bubbles.

10. A process according to claim 8 wherein printing ink is applied to the skin surface over the broken bubbles.

11. A process of treating the foamable skin surface of a sheet of a composition comprising a polymer of a monoolefin having 2–3 carbon atoms, said sheet comprising a foamable skin composed of a foamable composition containing said polymer integrally united to a foamed composition layer containing said polymer, heating said skin to form bubbles at least on the surface of the skin and to give a relatively low polymer viscosity in said heated area, and breaking said bubbles in the skin to form exposed fragments of bubbles while maintaining the bubbles in the foamed layer unbroken, said skin being of substantially lesser thickness than said foamed layer, whereby the adhesion of said skin to printing and vinylidene chloride polymers is improved.

12. A process according to claim 11 wherein the heating is regulated so that bubbles are formed only partially through said skin and said polymer is polyethylene.

13. A process according to claim 11 wherein the heating is regulated so that bubbles are formed only partially through said skin and said polymer is polypropylene.

14. A process according to claim 11 wherein said foamable composition contains sufficient nucleating agent to keep the bubbles formed in said skin not over 10 microns in diameter.

15. A process of treating a film of an unfoamed but foamable composition of a polymer of a monoolefin having 2–3 carbon atoms to improve the adherence of the film to printing ink and vinylidene chloride polymers comprising heating the surface area only of said film sufficiently to form bubbles while maintaining the balance of the thickness of the film bubble free, said surface area extending to not more than half the thickness of the film, said heat being sufficient to give a relatively low polymer viscosity in the heated area, and breaking said bubbles in the heated area to form exposed fragments of bubbles.

16. A process according to claim 15 wherein a nucleating agent is present in amount sufficient to keep the bubbles formed in said surface area not over 10 microns in diameter.

17. In a process of applying printing to a polymer of a monoolefin having 2–3 carbon atoms the improvement comprising applying the printing to the exposed fragments of bubbles on the surface of a composition including said polymer, said surface having been formed by heating the surface area only of a foamable composition containing said polymer sufficiently to both form a multitude of small bubbles therein and to break said bubbles into exposed fragments.

18. A process for obtaining a microporous printable polymer of a monoolefin containing 2–3 carbon atoms comprising providing a closed cell foamed composition containing said polymer and removing a fraction of the bubbles in the surface only of the composition so that exposed open fragments of bubbles are formed.

19. In a process of applying a coating to a polymer of a monoolefin having 2–3 carbon atoms the improvement comprising applying the coating to the exposed fragments of bubbles on the surface of a foamed composition containing said polymer, said foamed composition being closed cell except for said exposed fragments.

20. A process according to claim 19 wherein the coating applied is printing.

21. A process according to claim 19 wherein the coating applied is a vinylidene chloride polymer.

22. A process for obtaining a microporous printable polymer of a monoolefin containing 2–3 carbon atoms comprising providing a closed cell foamed composition containing said polymer, cutting off a fraction of the bubbles only in the surface of the composition so that exposed open fragments of bubbles are formed.

23. A process according to claim 22 wherein the cutting is accomplished by grinding.

24. A process according to claim 22 wherein the foamed composition is in the form of a sheet.

25. A process according to claim 24 wherein the bubbles are less than 10 microns in diameter.

26. A process according to claim 25 wherein the cutting is accomplished by grinding to a depth of not over 1 mil and the sheet has a depth of at least twice the depth of the ground portion.

References Cited by the Examiner
UNITED STATES PATENTS

| | | | |
|---|---|---|---|
| 2,648,097 | 8/1953 | Kritchever | 117—47 |
| 2,968,576 | 1/1961 | Keller et al. | 117—47 |
| 3,061,460 | 10/1962 | Schickedanz | 117—47 |
| 3,170,974 | 2/1965 | Jacobs | 264—321 XR |

MURRAY KATZ, *Primary Examiner.*